United States Patent
Franklin

(10) Patent No.: US 6,272,265 B1
(45) Date of Patent: Aug. 7, 2001

(54) LIGHTING SYSTEM FOR TRANSMITTING AND RELEASING LUMINESCENT RADIATION

(75) Inventor: James Bruce Franklin, New South Wales (AU)

(73) Assignees: Sky Solutions Limited, Five Dock; Geoffrey Burton Smith, Epping; University of Technology, Sydney, Broadway, all of (AU)

(*) Notice: Subject to any disclaimer, the term of this patent is extended or adjusted under 35 U.S.C. 154(b) by 0 days.

(21) Appl. No.: 09/202,745
(22) PCT Filed: Jun. 17, 1997
(86) PCT No.: PCT/AU97/00386
  § 371 Date: May 5, 1999
  § 102(e) Date: May 5, 1999
(87) PCT Pub. No.: WO97/48946
  PCT Pub. Date: Dec. 24, 1997

(30) Foreign Application Priority Data

Jun. 17, 1996 (AU) .................................................. PO 0538

(51) Int. Cl.$^7$ ..................................................... G02B 6/42
(52) U.S. Cl. ........................... 385/31; 362/551; 362/558; 362/576; 385/146; 385/901
(58) Field of Search ...................... 385/133, 134, 385/146, 901, 31; 362/1, 2, 551, 558, 576

(56) References Cited

U.S. PATENT DOCUMENTS

| | | | |
|---|---|---|---|
| 4,411,490 | * 10/1983 | Daniel | 350/96.1 |
| 4,420,796 | 12/1983 | Mori | 362/32 |
| 4,539,625 | * 9/1985 | Bornstein et al. | 362/32 |
| 4,733,929 | * 3/1988 | Brown | 350/96.15 |
| 4,822,123 | 4/1989 | Mori | 350/96.1 |
| 5,309,544 | 5/1994 | Saxe | 385/146 |
| 5,432,876 | 7/1995 | Appeldorn et al. | 385/31 |
| 5,465,311 | * 11/1995 | Caulfield et al. | 385/27 |
| 5,745,266 | * 4/1998 | Smith | 359/34 |
| 5,857,761 | * 1/1999 | Abe et al. | 362/32 |

FOREIGN PATENT DOCUMENTS

| | | | |
|---|---|---|---|
| 4329914 | 3/1995 | (DE) | G02B/6/00 |
| 0093998 | 11/1983 | (EP) | F21S/5/00 |
| 0143856 | 6/1985 | (EP) | F21S/5/00 |
| 2153515 | 8/1985 | (GB) | F21V/8/00 |
| 4156404 | 5/1992 | (JP) | G02B/6/00 |
| 08138410 | 5/1996 | (JP) | F21M/3/18 |
| 1756739 | 8/1992 | (SU) | F21V/8/00 |
| WO9209909 | 6/1992 | (WO) | G02B/5/16 |
| WO9306413 | 4/1993 | (WO) | F21S/11/00 |
| WO9709564 | 3/1997 | (WO) | F21V/8/00 |

* cited by examiner

Primary Examiner—Hemang Sanghavi
Assistant Examiner—Omar Rojas
(74) Attorney, Agent, or Firm—Abelman, Frayne & Schwab

(57) ABSTRACT

An optical conduit (53) for transmitting and releasing luminescent radiation (61, 62, 63) emitted from a luminescent concentrator (51), the luminescent concentrator (51) and optical conduit (52) comprising an optical system which is adapted to release to an area to be illuminated the luminescent radiation which is otherwise trapped in the optical system by total internal reflection. The optical conduit (53) includes a luminaire (57), such as a plurality of scattering regions for scattering trapped light so that the scattered light acquires the angle of incidence required to released from the conduit (53). The scattering regions may be provided by shape irregularities on the surface of the conduit (53) or inhomogeneities within the conduit (53). The conduit (53) may consist of flexible overlaid light guides (65a, 65b and 65c) and a luminaire fitting (55) optically coupled thereto.

13 Claims, 3 Drawing Sheets

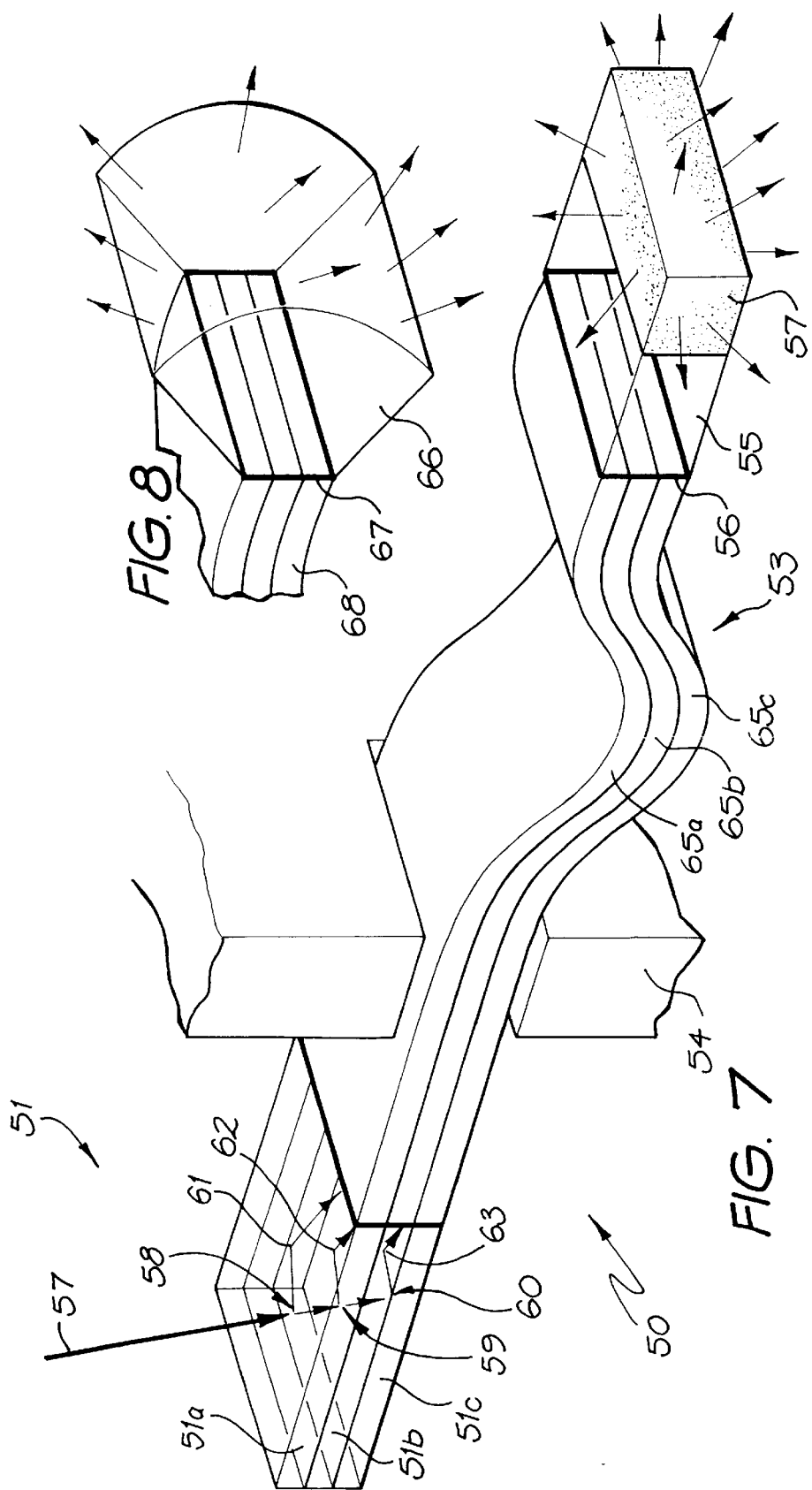

LIGHTING SYSTEM FOR TRANSMITTING AND RELEASING LUMINESCENT RADIATION

FIELD OF INVENTION

The present invention relates to a lighting system for transmitting and releasing luminescent radiation from luminescent concentrators or collectors and, in particular, to a lighting system in which trapped light generated from a luminescent solar concentrator may be transmitted and released.

Such lighting systems have particular application as means for substantially increasing the useful light provided by a luminescent concentrator whose output is transmitted to the interior of a building by a clear, smooth, optical conduit. In particular, the invention seeks to provide a means by which light that is ordinarily trapped in the concentrator can travel down the conduit, and a means by which this light can be released from the conduit at a location where illumination is required.

BACKGROUND ART

It is a fundamental principle of linear optics that no system in which all the light enters from outside the system can ever have any trapped light. It is the common general knowledge of persons skilled in the art that light trapping requires that once light is generated within a system it must be totally internally reflected off all surfaces and that the basic reason why linear optical systems cannot trap light that has entered from the outside is the fact that if light passes in through a surface at a particular angle then light travelling in the exact opposite direction will pass out through that surface. This is because linear optical systems are time reversible (Pedrotti, F. L., and Pedrotti, L. S., *Introduction to Optics*, page 38. Practice Hall International, Inc, New Jersey, 1987.).

If light enters a light guide system from the outside and is reflected from the far end, it will tend to reach the entry surface with an angle similar to that with which it started, and will thus be able to pass through that surface and so escape from the system. This means that the system in which light enters from an external source can have no trapped light.

Only light sources that generate light inside a material can produce internally trapped light (Saleh, B. E. A. and Teich, M.C., *Fundamentals of Photonics*, pages 18, 39, and section 16.1. Wiley, 1991). Examples of internal light sources are fluorescent molecules and electrons and hole pairs in semiconductor light emitting diodes. A portion of the emission from such sources is often completely trapped within the system by total internal reflection (Saleh and Teich 1991).

The key point is that this light can travel on a closed path but such a path cannot be duplicated by light entering from the outside. Light entering from the outside and returning to the entry surface will always strike it at an angle that lies outside the total internal reflection cone of angles and thus exits from the system.

Another simple argument based on fundamental thermodynamics can be used to show that no type of linear optical system can have trapped light enter from the outside. If it were possible for a linear system to losslessly accumulate light produced externally, then the light would be continuously accumulated without limit and so the energy density inside would increase without limit. Such a system could be used to generate temperatures which were arbitrarily larger than the source temperature—a clear violation of the Second Law of Thermodynamics. Internal source systems do not suffer from this problem because the accumulation of trapped light changes the properties of the system in a way that prevents the endless accumulation of light. For example, fluorescent dyes become opaque to their own emissions at large enough photon densities due to non linear effects and so a system using these dyes will eventually cease to accumulate trapped light.

Luminescent solar concentrators (also called light receiving stacks) are of increasing interest because of their ability to contribute to the transmission of sunlight to the interior of buildings, owing in large part to their lower installation, running and maintenance costs over both conventional lighting systems and solar lighting systems that use tracking mirrors.

Luminescent solar concentrators contain at least one luminescent species capable of emitting luminescent radiation upon excitation by incident solar radiation. A large proportion of the emitted luminescent radiation is totally internally reflected by the surfaces of the medium from which the concentrator is fabricated and propagates inside the medium to the concentrator's end surfaces.

For example, in a luminescent solar concentrator comprising a flat rectangular sheet, light emitted by luminescent species at small angles to the planar axis of the sheet is totally internally reflected by the sheet's upper, lower and side surfaces and propagates to one end surface where it can escape. It is also apparent that light emitted by luminescent species nearly perpendicular to the sheet's planar axis quickly escapes through an upper, lower or side surface without undergoing total internal reflection.

However, some of the luminescent light emitted at intermediate angles to the sheet's planar axis is totally internally reflected by the sheet's upper, lower and side surfaces and propagates to one end surface where total internal reflection from the end surface causes it to reverse its path and be reflected back down the sheet. This light is completely trapped within the sheet and is unable to escape through any smooth surface of the sheet. For example, in a flat rectangular sheet of refractive index 1.5 surrounded on all sides by air, each of the sheet's six surfaces release approximately 12.7% of the luminescent radiation, and 23.6% of the luminescent radiation is trapped within the sheet. (Most of the trapped light is eventually removed by absorption by the luminescent molecular species or by scattering from defects.)

The prior art has not successfully provided a means by which this trapped light may be released from the conduit at a location where illumination is required.

Luminescent concentrator/conduit systems known in the prior art consist of a luminescent concentrator which is connected to a smooth, transparent optical conduit which is, in turn, connected to a luminaire (which may be no more than the end of the optical conduit). Luminescent radiation from the concentrator enters the conduit where it is channelled by means of total internal reflection to the luminaire which allows the light to escape from the system in the required directions(s). For efficient light transfer to occur from the concentrator to the conduit, and along the conduit, the cross sectional area of the conduit (which may change along its length) must never be smaller than the exit area of the concentrator.

It has been found by the present inventors that if the joint between the concentrator and the conduit has a mismatch in refractive indices (as will always occur with an air gap and may occur with some glued joints), then a substantial fraction of the luminescent radiation striking the joint is reflected away from the conduit, back into the concentrator. For many concentrator geometries, this light is unable to escape through any surface.

It is therefore an object of the present invention to provide an optical conduit that includes luminaire means through which such 'trapped light' can exit the system in a useful manner. It is another object of the present invention to ensure that the luminescent concentrator and conduit are sufficiently closely coupled to enable the concentrator's 'trapped light' to enter the optical conduit, where it will substantially increase the amount of light that reaches the luminaire means at the end of the conduit.

SUMMARY OF INVENTION

According to the present invention there is provided a lighting system for enabling release of trapped light therefrom as useful illumination, comprising a luminescent concentrator, an optical conduit optically coupled to the luminescent concentrator, and a luminaire means, the lighting system being fabricated of light propagating material and having surfaces which define an optically continuous solid optical system for enabling light to propagate therethrough by total internal reflection off the surfaces, wherein the said light is luminescent radiation emitted from the luminescent concentrator and wherein a portion of the said luminescent radiation would be, if it were not for the luminaire means, trapped in the optical system and unable to be released therefrom, the luminaire means comprising at least one region being so arranged as to allow the said otherwise trapped portion of the luminescent radiation to acquire an angle of incidence to the or each said region that will enable release of the said otherwise trapped portion of the luminescent radiation from the lighting system, whereby the quantity of light released by the lighting system as useful illumination is enhanced.

Preferably, the luminaire means comprises a plurality of scattering regions for scattering the trapped portion of the luminescent radiation so that the scattered radiation acquires the said angle of incidence.

In a preferred form of the invention, the optical conduit is prepared by firstly extruding or casting a sheet of polymer material, then cutting to size and suitably polishing the edges.

Preferably, the plurality of scattering regions comprise shape variations or irregularities on the surface of the optical conduit at specific locations and of a predetermined spatial extent. The surface shape variations may comprise non-flat surfaces made by external abrasion, texturing, moulding or chemical etching.

For instance, the surface shape variations of the optical conduit may comprise a surface roughened by sand paper.

The plurality of scattering regions may also comprise a surface coating on the optical conduit, wherein the surface coating includes particulate matter capable of scattering the otherwise trapped portion of the luminescent radiation.

In another embodiment of the invention, the plurality of scattering regions comprise particulate matter embedded within the optical conduit or inhomogeneities within the optical conduit.

The purpose of the scattering centres is to scatter the trapped light out of the conduit which would otherwise remain trapped in the lighting system.

The plurality of scattering regions function by creating a change in the angle of incidence of the trapped light with respect to a surface of the optical conduit so that the light is emitted or released through that surface.

In yet another embodiment of the invention, the luminaire means comprises a portion of the conduit which is expanded greatly in cross sectional area so that the otherwise trapped portion of the luminescent radiation strikes a surface of the expanded portion at an angle that permits transmission through that surface. The luminaire means may, in such an embodiment, be cast simultaneously with the remainder of the conduit.

In still another embodiment, the luminaire means may be joined to the conduit by an optical joint. For most efficient results, the luminescent concentrator is coupled to the optical conduit, and the conduit is coupled to the luminaire means, by optical joints at which there is ideally no mismatch in refractive index between the concentrator, joint material, conduit and luminaire means.

Preferably, the optical joint is provided by a transparent coupling agent with a refractive index as close as possible to the square root of the product of the refractive indices of (a) the concentrator and the conduit and (b) the conduit and luminaire means (ie the geometric mean of their refractive indices).

UV cured optical cements or optical grade epoxy glues are suitable coupling agents. Another suitable coupling agent is optical gel, although, if this is used, the optical conduit must be held in mechanical alignment by other means.

It may also be possible to couple the conduit to the concentrator and the luminaire means to the conduit by other techniques known in the art, such as by solvent welding, ultrasound welding, and the like.

It is possible to eliminate the need for a coupling agent between the concentrator and conduit, by coating the luminescent material onto part of a continuous optical conduit or by casting the concentrator as a continuation of a preformed optical conduit, or by casting the optical conduit as a continuation of a preformed concentrator. Alternatively, the concentrator and optical conduit may be cast simultaneously.

However the joint from the luminescent concentrator to the optical conduit is made, it should ideally be defect free with no bubbles or voids and there should be no surplus coupling agent on the surfaces near the joint so that the lighting system is as optically continuous as possible and so that light may freely pass from the concentrator to the optical conduit without reflection or scattering. This optical continuity enables the 'trapped light' (ie the light that would be trapped in the absence of optical continuity) to enter the optical conduit, whereas a simple alignment or butt joint, even with very smooth surfaces, would not.

Preferably, the luminaire means comprises a light scattering portion at a first of two opposed ends of a light fitting adapted to be located in an area to be illuminated, the light fitting being optically coupled to the conduit at the second of its opposed ends, the light scattering portion having been treated in such a way so as to enable the otherwise trapped portion of the luminescent radiation to be released therefrom.

In a still further embodiment of the invention, the luminaire means may form a terminal part of the optical conduit.

Preferably, the luminescent concentrator is illuminated with sunlight.

BRIEF DESCRIPTION OF THE DRAWINGS

In order that the invention may be readily understood and put into practical effect, reference will be made to the accompanying drawings, in which:

FIG. 7 is an isometric view of a luminescent solar concentrator/conduit system according to another preferred embodiment of the invention.

FIG. 8 is an isometric view of an alternate luminaire means to be used in the luminescent solar concentrator/conduit system shown in FIG. 7.

MODES FOR CARRYING OUT THE INVENTION

Figure 1:
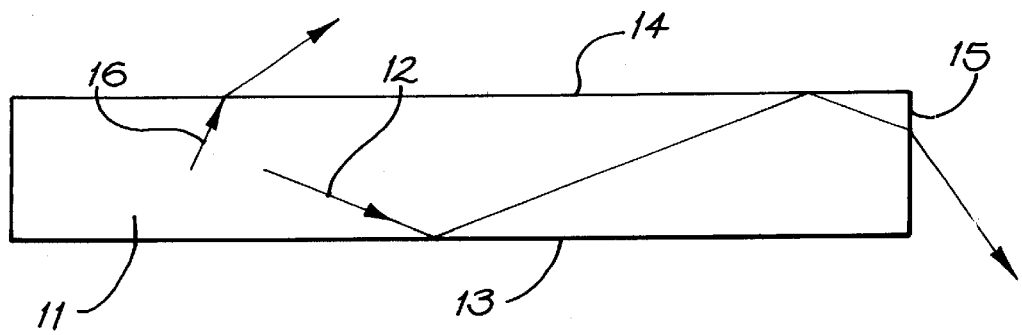
FIG. 1 is a schematic representation of the path of light emitted by luminescent species at small and large angles to the planar axis of a flat rectangular sheet used as a luminescent solar concentrator.

In the luminescent solar concentrator sheet 11 shown in FIG. 1, light 12 which is emitted by luminescent species (shown as the origin of the arrows) at small angles to the planar axis of the sheet 11 is totally internally reflected by the sheet's smooth lower surface 13 and smooth upper surface 14 and propagates to the end surface 15 where its angle of incidence and the refractive index at the interface enables it to be released or to escape from the sheet 11. Light 16 which is emitted by luminescent species nearly perpendicular to the planar axis of the sheet 11 immediately escapes through the upper surface 11 without undergoing total internal reflection.

Figure 2:
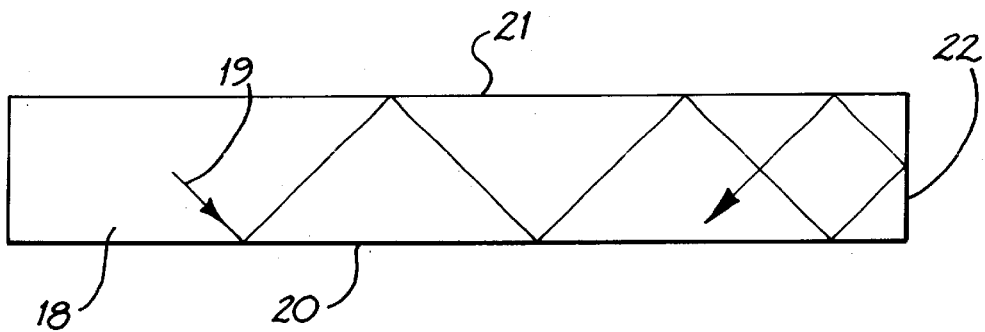
FIG. 2 is a schematic representation of the path of light emitted by luminescent species at an intermediate angle to the planar axis of the sheet shown in FIG. 1.

In the luminescent solar concentrator sheet 18 shown in FIG. 2, light 19 which is emitted by luminescent species at intermediate angles to the planar axis of the sheet 18 is totally internally reflected by the sheet's smooth lower surface 20 and smooth upper surface 21 and propagates to the smooth end surface 22 where its angle of incidence and the refractive index at the interface causes it to be totally internally reflected. The general direction of the path of the light 19 is now reversed by the total internal reflection and the light 19 is reflected back down the sheet 18. This light 19 is completely trapped within the sheet's smooth surfaces.

Figure 3:
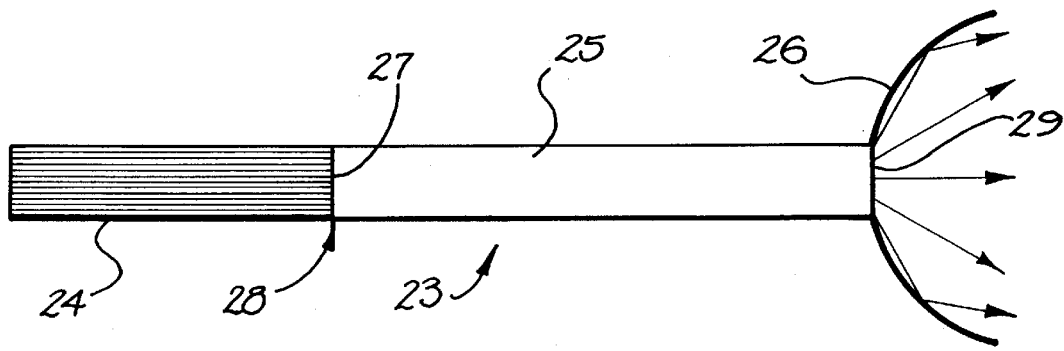
FIG. 3 is a schematic representation of a luminescent solar concentrator/conduit system known in the prior art.

The traditional luminescent concentrator conduit system 23 shown in FIG. 3 comprises a luminescent solar concentrator 24 connected to a smoothly surfaced transparent optical conduit 25 which is, in turn, connected to a cupped luminaire 26. The system 23 is surrounded by air. The cross-sectional area of the conduit 25 is, in this embodiment, the same as the cross-sectional exit area 27 of the concentrator 24, and there is an optical joint 28 between the concentrator 24 and conduit 25 (whereby the refractive indices (RI's) of the concentrator 24, joint 28 and conduit 25 are identical), thereby enabling efficient light transfer from the concentrator 24 to the conduit 25 and along the conduit 25. However, not all of this light is able to escape through the end surface 29 so that the cupped luminaire 26 may direct the released light as shown in FIG. 3.

If the luminescent concentrator/conduit system 23 has an RI of 1.5, each of the six surfaces of the system 23 will release about 12.7% of the luminescent radiation, whereas about 23.6% of the luminescent radiation will be trapped within the system 23, most of this trapped light being eventually absorbed by the luminescent species in the concentrator 24 or being scattered by defects.

The effect of the cupped luminaire 26 as a means for directing light concentrated by the system 23 is, therefore, not significant, as it is only able to direct light that has been released through the end surface 29, and much useful light is either lost through the other surfaces or trapped within the system 23.

Figure 4:
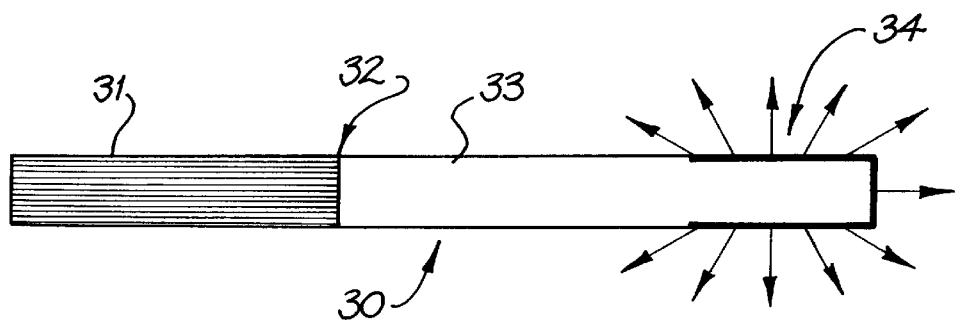
FIG. 4 is a schematic representation of a luminescent solar concentrator/conduit system which includes an optical conduit according to a first preferred embodiment of the invention.

The luminescent concentrator/conduit system 30 shown in FIG. 4 comprises a luminescent solar concentrator 31 connected by an optically continuous joint 32 to a smooth optical conduit 33. A luminaire 34 for the conduit 33 is produced by introducing light scattering centres at the appropriate portion of the conduit 33 where illumination is required. In the present embodiment, the scattering centres are on the surface of the conduit 33, but they may be in the bulk material from which the conduit 33 is fabricated. The scattering centres scatter the trapped light out of the conduit 33 by creating a change in the angle of incidence of the trapped light with respect to the surface portions. Such scattering centres serve as the luminaire 34.

Figure 5:
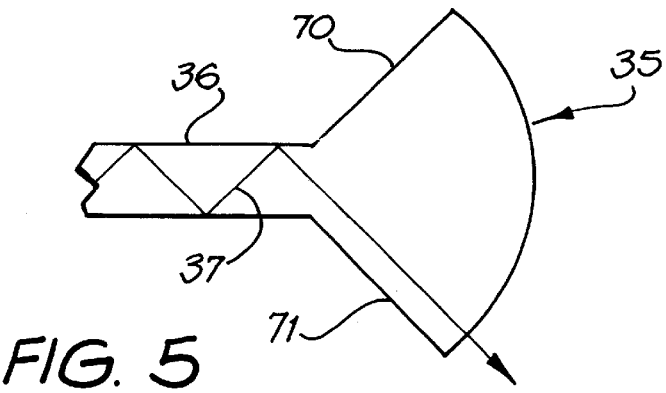
FIG. 5 is a schematic cross-sectional representation of an end portion of an optical conduit according to a second preferred embodiment of the invention.

FIG. 5 shows an enlarged end portion 35 of an optical conduit 36. The enlarged end portion 35 is optically continuous with the conduit 36 and has a greatly enlarged cross-sectional area so as to enable the totally internally reflected light 37 to strike a surface of the end portion 35 at an angle that permits the light to be released through that surface. The optical continuity is provided by an optical joint between the separately cast conduit 36 and the enlarged end portion 35, or by casting the optical conduit simultaneously with the enlarged head portion 35. The shapes which may be suitable for the enlarged head portion 35 will be described later in the specification.

Figure 6:
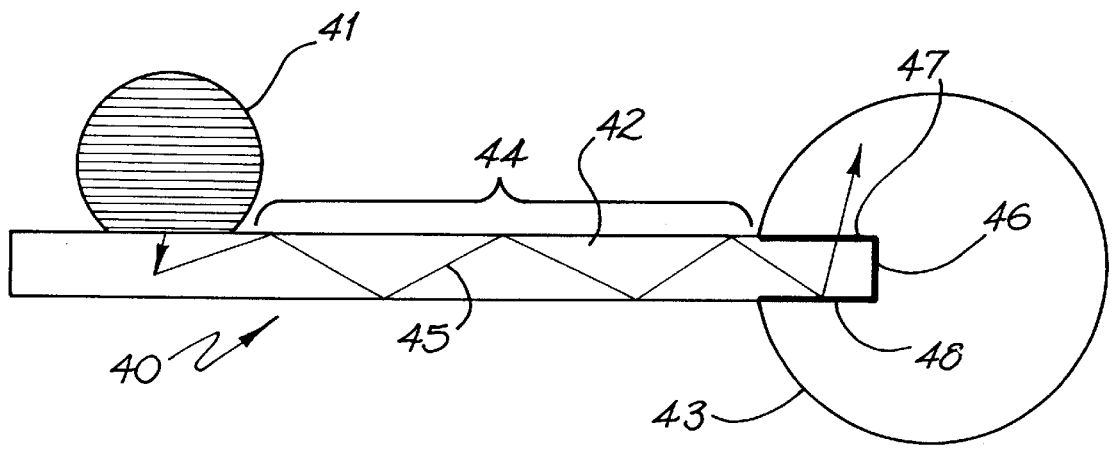
FIG. 6 is a schematic representation of a luminescent solar concentrator/conduit system which includes the optical conduit to FIG. 4.

As shown in FIG. 6, a concentrator sheet 40 dyed with about 70 ppm Lumogen 083™ "yellow" dye (which emits green light at the concentrations used) was exposed to a fluorescent lamp 41 only at one end, as shown, with the middle portion 44 of the sheet 40 serving as an optical conduit 42 as it did not have any light exposure thereon. The total light output from the optical conduit 42 at the opposite end was measured with an integrating sphere 43. No optical joint was considered necessary for this example of a concentrator/conduit system.

The sheet dimensions were 270 mm×20 mm×2 mm.

The final 50 mm of the optical conduit 42 was treated in various ways so that the total internally reflected light 45 could be scattered and released out the side.

As will be described later, it was found that light was released from the conduit 42 both through the end surface 46, hereinafter defined as end light, and through the side surfaces at the end of the conduit 42 (top and bottom side surfaces 47 and 48 shown, but near side and far side surfaces not shown), hereinafter defined as side light.

Various treatments were found suitable for the final 50 mm of the optical conduit 42 including (a) roughening one or more surfaces with 1200 grade, 600 grade, 400 grade, 240 grade and 120 grade "wet and dry" sand papers (b) attaching "diffuse" sticky tape to the top and bottom side surfaces (c) gluing diffuser sheets to the surfaces and (d) dipping the final 50 mm into acetone for various intervals (which roughens the surfaces). The grooves made with sand papers were mostly perpendicular to the long axis of the conduit 42 and their direction seemed not to be important. These various treatments have different efficiencies.

All of the above treatments gave more light output than no treatment, where the only light output was through the end surface 46 as end light. The best results of 63% more light were obtained when 1200 grade paper was used to roughen the top side surface only. However, even 120 grade paper on all side surfaces gave 43% more light than no treatment. In the conduit treated with 1200 grade paper, the side light leaked out over the first 3 or 4 centimetres of the 50 mm treated length. In the more roughly treated conduits, the side light leaked out within the first centimetre of the 50 mm treated length of conduit. However, in all of the conduits treated with sand paper, about one quarter of the light came out the end surface 46. This suggests that the surface roughness was imperfect, as ideally almost all the light should have been released as side light if the surface was sufficiently rough.

In experiments with various conduits, the level of trapped light gains has also been sensitive to the quality of the joint and of the luminescent concentrator. Gains in excess of 50% are practical.

The extent to which the side surfaces of the conduit should be roughened with sand paper or other forms of surface abrasion must not be such that it will cause a reversal in the direction of the internally scattered light, and nor should the length of the roughened region be so short that any reversely scattered light cannot undergo a second or more subsequent forward scattering.

Some treatments have been found to backscatter both trapped and end light, and these treatments must be avoided.

It is envisaged that an even more improved light output may be achieved when bulk scattering regions are present on or within the optical conduit.

For instance, during the manufacture of the optical conduit, bulk scattering centre forming materials, such as calcium carbonate, zeolites and titanium dioxide, may be included in the medium that is shaped and solidified into the conduit. Alternatively, these materials may be included in a paint or other surface applicable material that is coated on to the conduit. A coating of a polymer that includes fine scattering particles may also be used.

Small bubbles or other inhomogeneities may also be incorporated in the conduit during its manufacture to generate scattering regions. Such inhomogeneities may be produced by adding particles of a polymer or other scattering material which has a slightly different RI to the other material from which the conduit is made. The region of conduit at which such inhomogeneities or small bubbles occur serves as the luminaire means.

The above treatments may result in an increase in the frequency of scattering interactions within the conduit, so that otherwise trapped light can be scattered such that it acquires an angle of incidence to the side surfaces for the scattered light to escape the conduit. Preferably, the increased scattering is in a forward direction along the conduit.

FIG. 7 shows a luminescent concentrator conduit system 50 comprising a three layered stack solar collector or concentrator 51 coupled by an optical joint 52 to a flexible optical conduit 53 which comprises three overlaid light guides 65a, 65b and 65c and a luminaire fitting 55. The solar collector 51 (consisting of three overlaid fluorescent sheets 51a, 51b and 51c) is located externally of a building or the like so that it is exposed to sunlight (shown impacting the solar collector 51 by arrow 57 and being absorbed by luminescent species at locations 58, 59 and 60, so that these species fluorescently emit light (luminescent radiation) shown by arrows 61, 62 and 63 that is trapped within the solar collector 51 by total internal reflection). The optical cable 53 passes through a wall 54 of the said building to the area to be illuminated.

The aforementioned system 50 is similar to a sunlight collecting and transmitting system disclosed in Australian Patent No. 661,716 to the same inventors. The teachings of Australian Patent No. 661,716 are included herein by reference.

The specially fabricated luminaire fitting 55, adapted to be located in the area to be illuminated, is coupled to the end surface of the three overlaid light guides 65a, 65b and 65c by an optical joint 56. At the free end of the fitting 55 is a terminal scattering portion 57 which is treated in any of the aforementioned ways so that the portion 57 can serve as a luminaire for the trapped light to exit the system (as shown by the arrows which radiate outwardly from all side surfaces of the portion 57).

Alternatively, the terminal scattering portion may comprise the entire luminaire fitting 55 so that the flexible overlaid light guides are optically coupled directly to a terminal scattering member. Such a scattering member may be made of diffuse material, such as opalescent plastic, or include an outer layer of diffuse material. The diffuse material is envisaged to cause a gradual scattering of light in the forward direction.

As previously mentioned with reference to FIG. 5, the conduit may also terminate in an enlarged end portion 35, such as a cone shaped member with a curved end surface (where the conduit is cylindrical) or as an angular sector of a cylinder member (where the conduit is a rectangular prism) of the same refractive index as the conduit but, say, about five times the thickness of the conduit. The angular sector of a cylinder member 66 is shown in FIG. 8 coupled by an optical joint 67 to a flexible rectangular prism conduit 68 consisting of overlaid light guides similar to that shown in FIG. 7. As a result of the enlarged configuration of the end portion, which serves as the luminaire means, previously trapped light will pass from the conduit into the enlarged end portion and escape out of the end surface of the enlarged end portion to illuminate the adjacent area. The side surfaces 70 and 71 of the enlarged end portion 35 or 66 may include a plurality of scattering regions such as surface coatings, or shape variations formed as a result of the casting process or abrasion to assist in release of trapped light. The surface coating includes particulate matter capable of scattering trapped light.

Various other modifications may be made in details of design and construction without departing from the scope and ambit of the invention.

What is claim is:

1. A lighting system which utilizes fluorescent species to generate fluorescently emitted radiation within a luminescent concentrator, said lighting system comprising:

a luminescent concentrator containing fluorescent species, an optical conduit optically continuous with the luminescent concentrator, and a luminaire means, optically continuous with said optical conduit, said luminaire means being adapted to be located in an area to be illuminated, wherein light is provided by the fluorescent radiation emitted within said luminescent concentrator, the lighting system being fabricated of light propagating material and having surfaces which define an optically continuous solid optical system for enabling said light to propagate therethrough by total internal reflection off the surfaces, and wherein said luminaire means contains at least one region allowing an internally trapped portion of the fluorescent radiation within the lighting system to acquire an angle of incidence to a surface of the luminaire means that enables release of said internally trapped portion of the fluorescent radiation from the luminaire means.

2. The lighting system of claim 1, wherein the luminaire means comprises a plurality of scattering regions for scattering the trapped portion of the fluorescent radiation so that the scattered radiation acquires the said angle of incidence.

3. The lighting system of claim 2 wherein the plurality of scattering regions comprise shape variations or irregularities on the surface of the optical conduit at specific locations and of a predetermined spatial extent.

4. The lighting system of claim 3 wherein the surface shape variations of the optical conduit comprise a sand paper roughened surface.

5. The lighting system of claim 2 wherein the plurality of scattering regions comprise a surface coating on the optical conduit, wherein the surface coating includes particulate matter capable of scattering the otherwise trapped portion of the luminescent radiation.

6. The lighting system of claim 2 wherein the plurality of scattering regions comprise inhomogeneities within the optical conduit.

7. The lighting system of claim 6 wherein the inhomogeneities comprise particulate matter embedded within the optical conduit.

8. The lighting system of claim 2 wherein the plurality of scattering regions comprise at least one diffuse self adhesive film attached to the optical conduit or diffuser sheets glued to the optical conduit.

9. The lighting system of claim 1, wherein the luminaire means comprises a portion of the optical conduit which is expanded greatly in cross sectional area so that the otherwise trapped portion of the fluorescent radiation strikes a surface of the expanded portion at an angle that permits transmission through that surface.

10. The lighting system of claim 9, wherein the expanded portion of the optical conduit includes a plurality of scattering regions comprising shape variations on one or more surface of the expanded portion, or inhomogeneities within the expanded portion, or a surface coating including particulate matter capable of scattering light on one or more surface of the expanded portion.

11. The lighting system of claim 1, wherein the luminaire means comprises a light scattering region at a first of two opposed ends of a light fitting adapted to be located in an area to be illuminated, the light fitting being optically coupled to the conduit at the second of its opposed ends, the light scattering region having been treated in such a way so as to enable the otherwise trapped portion of the fluorescent radiation to be released therefrom.

12. The lighting system of claim 1 wherein the optical conduit comprises an extruded or cast sheet of polymer material, which sheet has polished edges.

13. The lighting system of claim 3, wherein the surface shape variations comprise non-flat surfaces selected from the group consisting of externally abraded, textured, moulded or chemically etched surfaces.

\* \* \* \* \*